United States Patent
Marinho et al.

(10) Patent No.: US 11,016,925 B2
(45) Date of Patent: May 25, 2021

(54) PROTOCOL-TOLERANT COMMUNICATIONS IN CONTROLLER AREA NETWORKS

(71) Applicant: Freescale Semiconductor, Inc., Austin, TX (US)

(72) Inventors: Marcelo Marinho, Campinas (BR); Frank Herman Behrens, Campinas (BR); Patricia Elaine Domingues, Campinas (BR); Antonio Mauricio Brochi, Campinas (BR)

(73) Assignee: NXP USA, Inc., Austin, TX (US)

( * ) Notice: Subject to any disclaimer, the term of this patent is extended or adjusted under 35 U.S.C. 154(b) by 1002 days.

(21) Appl. No.: 14/669,018

(22) Filed: Mar. 26, 2015

(65) Prior Publication Data

US 2016/0283432 A1    Sep. 29, 2016

(51) Int. Cl.
| | |
|---|---|
| G06F 13/42 | (2006.01) |
| G06F 11/14 | (2006.01) |
| H04L 1/00 | (2006.01) |
| H04L 1/16 | (2006.01) |

(52) U.S. Cl.
CPC ...... *G06F 13/4282* (2013.01); *G06F 11/1443* (2013.01); *H04L 1/00* (2013.01); *G06F 2201/805* (2013.01); *H04L 1/1671* (2013.01)

(58) Field of Classification Search
CPC ..... G06F 13/4282; G06F 11/1443; H04L 1/00
USPC ........................................................ 710/301
See application file for complete search history.

(56) References Cited

U.S. PATENT DOCUMENTS

| | | | | |
|---|---|---|---|---|
| 5,459,836 A | * | 10/1995 | Whittaker ............. | G06F 15/167 709/213 |
| 8,897,319 B2 | | 11/2014 | Fredricksson | |
| 2008/0186870 A1 | * | 8/2008 | Butts ................... | H04L 41/0659 370/252 |
| 2014/0129748 A1 | | 5/2014 | Muth | |
| 2014/0258581 A1 | * | 9/2014 | Hartwich ............ | G06F 13/4282 710/307 |

(Continued)

FOREIGN PATENT DOCUMENTS

| | | |
|---|---|---|
| EP | 2712123 A1 | 3/2014 |
| WO | WO2014096272 A1 | 6/2014 |

OTHER PUBLICATIONS

Robert Bosch, "CAN with Flexible Data-Rate", Specification Version 1.0 released Apr. 17, 2012; Published Dec. 11, 2015 (Year: 2015).*

*Primary Examiner* — Idriss N Alrobaye
*Assistant Examiner* — Brooke J Taylor

(57) ABSTRACT

Systems and methods for protocol-tolerant communications in a Controller Area Network (CAN) are described. In some embodiments, a method may include receiving a frame at a network node; identifying, by the network node, a bit in a selected field of the frame; and determining, by the network node, that the frame follows a second format despite the bit indicating that the frame follows a first format. In other embodiments, a CAN controller includes message processing circuitry; and a memory coupled to the message processing circuitry, the memory having program instructions that configure the message processing circuit to: receive a frame; identify a bit in a selected field of the frame; and determine that the frame follows a Classical CAN format despite the bit indicating that the frame follows a flexible data-rate CAN (CAN FD) format.

17 Claims, 4 Drawing Sheets

(56) References Cited

U.S. PATENT DOCUMENTS

| | | | |
|---|---|---|---|
| 2014/0280636 A1* | 9/2014 | Fredriksson | H04J 3/0652 709/206 |
| 2014/0337549 A1* | 11/2014 | Hartwich | H04L 12/4013 710/106 |
| 2014/0359179 A1* | 12/2014 | Aue | G06F 13/42 710/106 |
| 2015/0082123 A1* | 3/2015 | Hartwich | G06F 11/073 714/768 |
| 2015/0089236 A1* | 3/2015 | Han | H04L 9/3242 713/181 |
| 2015/0172298 A1* | 6/2015 | Otsuka | H04L 63/123 726/30 |
| 2015/0373158 A1* | 12/2015 | Kim | H04L 12/40189 709/223 |

* cited by examiner

PROTOCOL-TOLERANT COMMUNICATIONS IN CONTROLLER AREA NETWORKS

FIELD

This disclosure relates generally to controller area networks, and more specifically, to systems and methods for protocol-tolerant communications in controller area networks.

BACKGROUND

A Controller Area Network (CAN) is an asynchronous serial bus network that connects devices, sensors, and actuators in various control applications (e.g., automotive, industrial automation, avionics, medical and office equipment, consumer appliances, etc.). Different CAN networks have different performance characteristics. Automotive CAN networks, for example, may be divided into two distinct categories—body control and powertrain. Body control networks enable communications among passenger comfort and convenience systems, and are typically less resource-intensive than powertrain networks, which service engine and transmission control.

Over the course of the last decade, three major physical layer designs have emerged in most CAN applications. All three communicate using a differential voltage on a pair of wires and are commonly referred to as: high-speed CAN (e.g., at rates of up to 1 Mbps), low-speed CAN (e.g., at rates of up to 125 Kbps), and Flexible Data-Rate (FD) CAN (e.g., up to 8 Mbps). Other CAN interfaces, however, may communicate using a single wire (e.g., at rates of up to 33.3 Kbps). Generally speaking, each node in a CAN network may be able to transmit and receive messages over a CAN bus.

Generally speaking, although CAN FD nodes maintain backwards compatibility with Classical CAN nodes, Classical CAN nodes are not capable of processing CAN FD messages. To allow CAN and CAN FD nodes to co-exist in the same network, the current CAN FD International Organization for Standardization (ISO) specification defines a "protocol exception" features that allows a "tolerating" but otherwise Classical CAN node to detect a CAN FD frame and enter into a protocol exception state without sending an error frame back to the network.

The inventors hereof have recognized, however, that in some situations the current CAN protocol exception feature is not able to differentiate between erroneous bits in a Classical CAN fame and valid bits in a CAN FD frame. As result, local errors may not be notified to the transmitter node and the receiver may not receive the CAN message, which is not retransmitted.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Embodiments disclosed herein are configured to provide systems and methods for protocol-tolerant communications in a controller area network (CAN). The current Flexible Data-Rate (FD) CAN (CAN FD) International Organization for Standardization (ISO) specification defines a "protocol exception" procedure so that CAN tolerating FD nodes can detect a recessive FD format (FDF) bit of a CAN FD frame transmitted by a transmitting node, enter in protocol exception state, and do not destroy the CAN FD frame by responding to the transmitting CAN node with an error frame or message. Unfortunately, conventional protocol exception has at least one weakness; that is, the procedure does not allow a receiving CAN node to distinguish an error in a FDF bit of a Classical CAN frame from a valid reserved bit (e.g., r0 or r1) in a CAN FD frame. As result, the error may not be notified to the transmitter node and the receiver node may not receive the CAN message, which is not retransmitted.

For example, suppose a Classical CAN frame is transmitted on a CAN bus targeting a Classical CAN node that is capable of implementing the ISO-defined protocol exception procedure. In that case, if the dominant FDF bit of the CAN frame is flipped locally (e.g., at the Rx input of the Classical CAN node, which is characteristic of a "local error"), then the Classical CAN node determines the FDF bit as being recessive, and enters a protocol exception state. The node then simply ignores that frame as if it were an incompatible CAN FD message. That is, the Classical CAN frame is interpreted by the Classical CAN node as a CAN FD frame and therefore is ignored by that node. If the remainder of the receiving nodes in the CAN bus acknowledge the frame as correct, then the message will not be retransmitted and the Classical CAN node will miss the message.

Accordingly, in some embodiments, systems and methods may provide a new CAN tolerating FD implementation that is configured to detect local errors in the reserved bit (r0) during reception of a Classical CAN frame. Using systems and methods described herein, the Classical CAN node may analyze the complete frame to check its format in response to having found the foregoing errors. If an invalid format is detected, then an error frame may be generated in the CAN bus, causing the message to be retransmitted. No message is lost due to the local error condition.

Although some of the examples herein are discussed in the context of automotive environments, these techniques may also be employed in other environments (e.g., industrial automation, avionics, medical and office equipment, consumer appliances, etc.).

Figure 1:
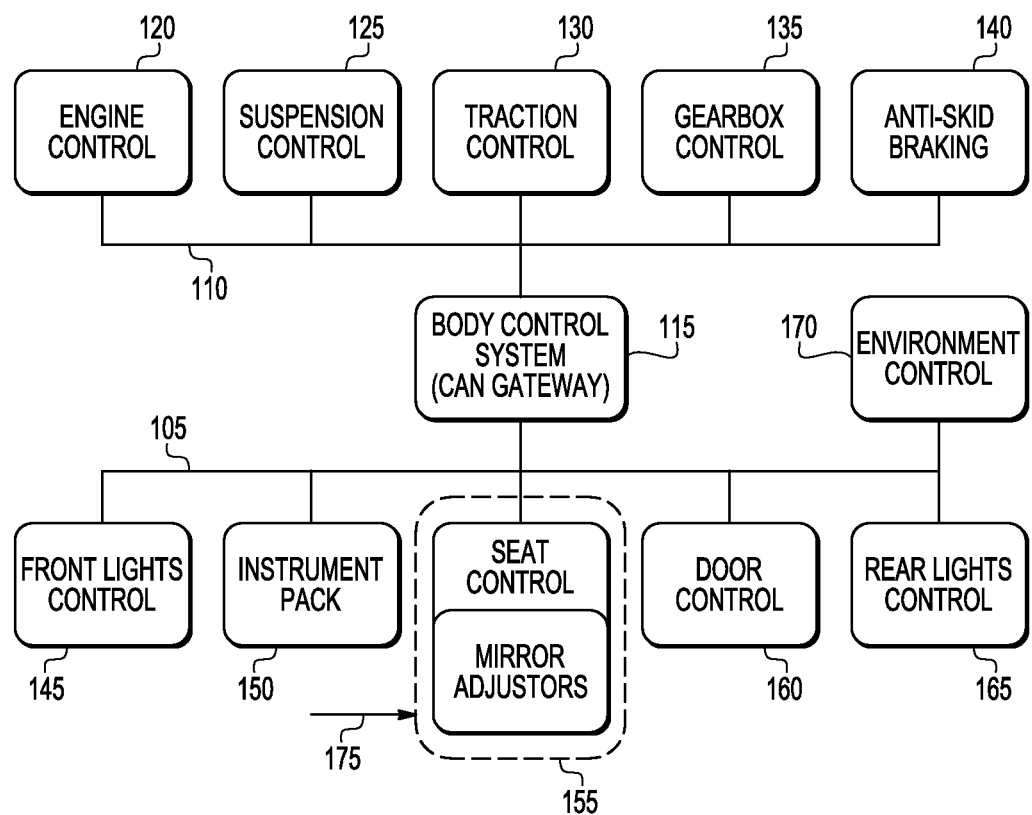
FIG. 1 is a block diagram of a Controller Area Network (CAN) in an automotive environment according to some embodiments.

Turning to FIG. 1, a block diagram of an example of CAN network 100 deployed in an automobile is depicted. In some embodiments, one or more of nodes or devices 115-170 may be implemented, at least in part, using one or more of the systems and methods described below. As illustrated, CAN gateway 115 (e.g., body control system) is coupled to low-speed CAN bus 105 as well as high-speed CAN bus 110, and it may be configured to enable communications between nodes across the two buses. Powertrain devices or nodes coupled to high-speed CAN bus 110 include: engine control 120, suspension control 125, traction control 130, gearbox control 135, and anti-skid breaking 140. Conversely, body control devices or nodes coupled to low-speed CAN bus 105 include front lights control 145, instrument pack 150 (e.g., dashboard displays and information systems, etc.), seat/mirror control 155, door control 160 (e.g., remote lock/unlock, windows, etc.), rear lights control 165, and environment control 170 (e.g., A/C, heater, particle filter, etc.).

In some embodiments, the communication protocol used in various communications among components 120-170 may be the CAN protocol defined in the international standard ISO 11898-1, which defines both the Classical CAN format and the CAN FD format. Accordingly, in some embodiments, low-speed CAN bus 105 may operate based upon the ISO 11898-3 standard and high-speed CAN bus 110 may operate based upon the ISO 11898-2 standard.

It is emphasized that automotive CAN network 100 is shown only by way of example. Other nodes or elements may be present in CAN network 100, and those elements may be connected in different ways. In some cases, one or more of nodes 115-170 may be divided into sub-nodes. For instance, the mirror control portion of seat/mirror control node 155 may be coupled to single-wire CAN interface or bus 175. In other cases, one or more of nodes 115-170 may be combined into fewer nodes. Additionally or alternatively, one or more of nodes 115-170 may be networked using a Local Interconnect Network (e.g., ISO 7498) bus or other suitable communication bus. Examples of other types of devices or nodes that may be present in CAN network 100 include, but are not limited to, airbag controls, sunroof controls, alarms, navigation systems, entertainment devices (e.g., video, audio, etc.), parking assistance modules, communication modules (e.g., cellular, Bluetooth®, Wi-Fi®, etc.), diagnostic systems (e.g., on-board diagnostics), etc.

Figure 2:
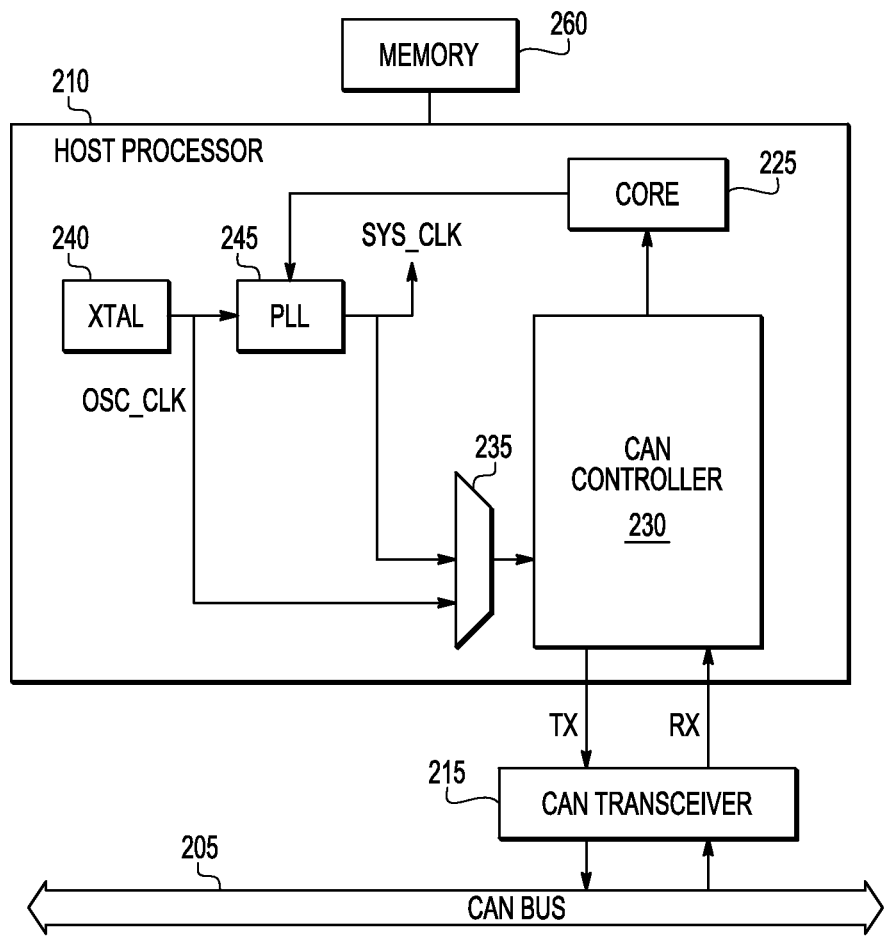
FIG. 2 is a block diagram of a CAN node according to some embodiments.
Figure 3:
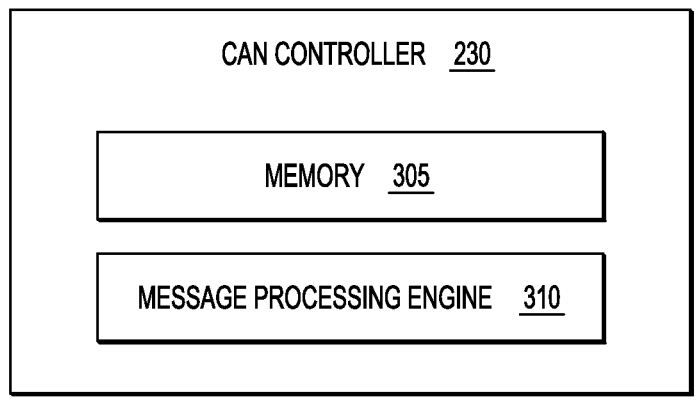
FIG. 3 is a block diagram of a CAN controller according to some embodiments.

In some embodiments, each of nodes 115-170 may include one or more host processors as well as one or more sensors and/or actuators configured to perform one or more operations. In addition, nodes 115-170 may communicate with each other in a multiplexed fashion over CAN network 100, which provides a multi-master broadcast serial bus. For example, each of nodes 115-170 may include a CAN controller integrated within its host processor and/or operably coupled thereto, as illustrated in FIGS. 2 and 3. As such, nodes 115-170 may be configured to send and receive messages to each other using their respective CAN controllers, each message being serially transmitted onto the CAN bus and having an identifier (ID) portion (e.g., 11 or 29 bits) and a payload portion (e.g., 8 bytes for high or low speed CAN, or 64 bytes for Flexible Data Rate (FD) CAN).

FIG. 2 is a block diagram of an example of CAN node 200. In some embodiments, CAN node 200 may be one or more of nodes, devices, or components 115-170 in FIG. 1. As illustrated, CAN node 200 includes host processor 210, which in turn includes crystal oscillator signal source 240, phase-locked loop (PLL) circuit 245, at least one processor core 225, multiplexing or selecting circuit 235, and CAN controller 230. CAN transceiver 215 is coupled to CAN bus 205 (e.g., one of buses 105 or 110 in FIG. 1), as well as CAN controller 230. Memory 260 is coupled to host processor 210. In this diagram, portion(s) of CAN node 200 that would be specific to a given deployment (e.g., particular sensor(s) and/or actuator(s)) have been omitted for sake of simplicity, although it should be understood that any number of different peripheral devices (not shown) may be coupled to host processor 210 via any suitable interface.

The illustrative, non-limiting implementation of CAN node 200 in FIG. 2 depicts CAN controller 230 and multiplexing or selecting circuit 235 integrated into host processor 210. In other implementations, however, CAN controller 230 and multiplexing and/or selecting circuit 235 may be, at least in part, physically separate from host processor 210 but otherwise operably coupled thereto. For example, two or more host processors 210 may use a single CAN controller 230 shared among them. More generally, it should be noted that numerous variations of CAN node 200 will be apparent to a person of ordinary skill in the art in light of this description. For instance, host processor 210 may include two or more processor cores (e.g., dual-core, quad-core, etc.), memory 260 and/or CAN transceiver 215 may be at least partially integrated within host processor 210, etc.

During normal operation, host processor 210 may be configured to execute one or more instructions stored in memory 260 to thereby perform its programmed tasks. One or more of these tasks may be specific to the node's purpose(s) within CAN network 100 (e.g., traction control node 130 performs traction control tasks). Other tasks may include processing CAN messages received (RX) over CAN bus 205 through CAN transceiver 215 and CAN controller 230, and/or transmitting CAN messages (TX) over CAN bus 205 through CAN controller 230 and CAN transceiver 215. In certain implementations, CAN controller 230 may store serially received bits from CAN bus 205 until an entire CAN message is received, which may then be provided to core 225 (e.g., upon the triggering of an interrupt). Conversely, CAN controller 230 may transmit CAN messages received from core 225 serially onto CAN bus 205 in an appropriate format.

Crystal oscillator signal source 240 may provide a clock signal ("OSC_CLK") that is processed by PLL circuit 245 to generate yet another clock signal ("SYS_CLK"), which may then be used by core 225 in host processor 210.

Embodiments of host processor 210 may include, but are not limited to, application specific integrated circuits (ASICs), system-on-chip (SoC) circuits, digital signal processors (DSPs), field-programmable gate arrays (FPGAs), processors, microprocessors, controllers, microcontrollers (MCUs), or the like. Memory 260 may include any tangible memory apparatus, circuit, or device which, in some cases, may be integrated within host processor 210 as one chip. For example, memory 260 may include flip-flops, registers, Static Random Access Memory (SRAM), Nonvolatile RAM (NVRAM, such as "flash" memory), and/or Dynamic RAM (DRAM) such as synchronous DRAM (SDRAM), double data rate (e.g., DDR, DDR2, DDR3, etc.) SDRAM, read only memory (ROM), erasable ROM (EROM), erasable programmable ROM (EPROM), electrically erasable programmable ROM (EEPROM), etc. In other cases, memory 260 may also include one or more memory modules to which the memory devices are mounted, such as single inline memory modules (SIMMs), dual inline memory modules (DIMMs), etc. CAN transceiver 215 may provide a physical layer (PHY) interface.

FIG. 3 is a block diagram of CAN controller 230 (shown in FIG. 2) according to some embodiments. As shown, CAN controller 230 includes memory 305 and message processing engine or circuitry 310, which may be operably coupled to each other.

During normal operation, message processing engine 310 may cause one or more CAN messages provided by core 225 and/or stored in memory 305 to be transmitted over CAN bus 205 through CAN transceiver 215. Message processing engine 310 may also receive one or more CAN messages provided by CAN transceiver 215 from CAN bus 205, decode and/or translate those received messages, and perform some additional processing. For example, in some cases, message processing engine 310 may cause a received CAN message to be provided to core 225.

Additionally or alternatively, message processing engine 310 may compare the contents of a received CAN message (e.g., identification and/or data bits) against stored information (e.g., in memory 305) to determine whether to take some predetermined action in response to the received message, etc. For instance, message processing engine 310 may select, depending upon the result of the comparison, one of a plurality of response messages stored in memory 305 to be transmitted over CAN bus 205 corresponding to the received CAN message. Furthermore, the selection and transmission of such a response message may be performed autonomously and without intervention from core 225.

Memory 305 may be configured to buffer one or more received or transmitted CAN messages. In some cases, memory 305 may also be configured to store program instructions that allow message processing engine 310 to process a received CAN message according to one or more of a plurality of different message handling protocols when CAN controller 230 is operating under a corresponding one of a plurality of operating modes. Additionally or alternatively, memory 305 may be further configured to store instructions that allow engine 310 to implement certain operations described herein.

In some embodiments, the modules or blocks shown in FIG. 3 may represent processing circuitry and/or sets of software routines, logic functions, and/or data structures that, when executed by the processing circuitry, perform specified operations. Although these modules are shown as distinct logical blocks, in other embodiments at least some of the operations performed by these modules may be combined into fewer blocks. Conversely, any given one of modules 305-310 may be implemented such that its operations are divided among two or more logical blocks. Although shown with a particular configuration, in other embodiments these various modules or blocks may be rearranged in other suitable ways.

Figure 4:
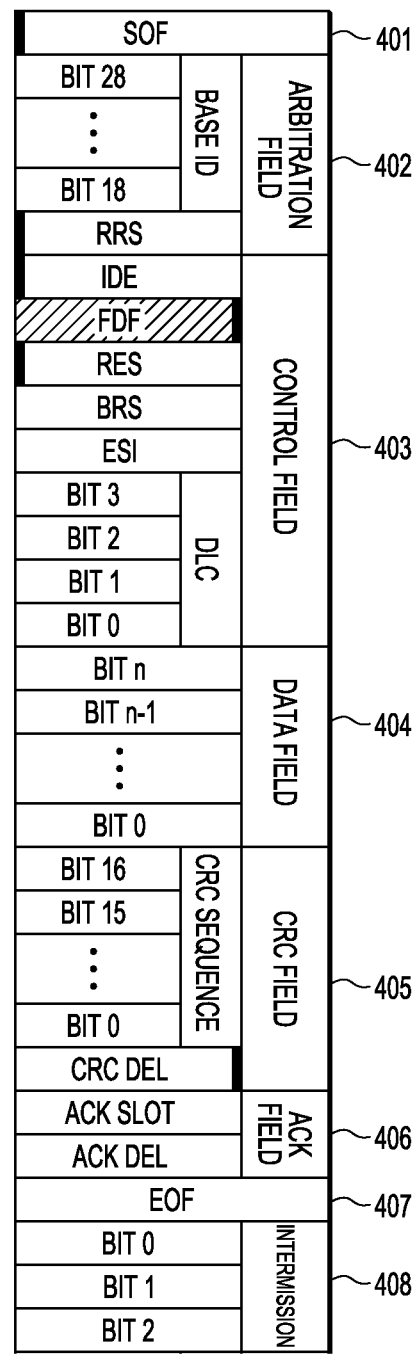
FIG. 4 is a diagram of a flexible data-rate (FD) CAN (CAN FD) frame according to some embodiments.

FIG. 4 is a diagram of a CAN FD frame according to some embodiments. In some examples, CAN FD frame 400 may be transmitted in a CAN network, where the network includes CAN FD nodes as well as legacy or Classical CAN nodes implementing the ISO-based protocol exception feature. Frame 400 may be exchanged between two or more of nodes or devices 115-170 in FIG. 1. The contents of the different fields of data frame 400 are outlined in Table I below:

TABLE I

| Field Name | Detail Number | Description |
| --- | --- | --- |
| Start-of-Frame (SOF) | 401 | Indicates the start of frame transmission |
| Arbitration Field | 402 | Bits used for an arbitration procedure |
| Control Field | 403 | Bits used for communication control |
| Data Field (payload) | 404 | Actual data transmitted or received |
| Cyclic Error Check (CRC) Field | 405 | CRC bits |
| Acknowledgement (ACK) Field | 406 | Indicates integrity of the data |
| End of Frame | 407 | Indicates end of frame |
| Intermission | 408 | Spacing between frames |

In addition to the foregoing fields, an error frame may also be included in CAN FD frame 400. Such an error frame is a frame structure that indicates an error during transmission or reception. The position within frame 400 where the error frame is inserted may vary according to the protocol. For example, the error frame may be generated at the moment when a formatting error is detected, for example, between Control Field 403 and CRC Field 405, or after Acknowledgement (ACK) Field 406. In some cases, the error frame may be separated from CAN FD frame 400 when the CAN FD frame does not include an actual error in a field other than the particular bits discussed herein (e.g., the FDF bit within control field 403).

In some embodiments, the FDF bit within control field 403 indicates whether frame 400 is a Classical CAN frame or a CAN FD frame. If the FDF bit has a dominant value (i.e., 0), then the frame follows the Classical CAN format and not the CAN FD format. Conversely, if the FDF bit has a recessive value (i.e., 1), then the frame follows the CAN FD format and not the Classical CAN format. Meanwhile, the reserved bit (RES) in CAN FD frame format has always a dominant value (i.e., 0). The RES bit is reserved for future protocol expansion and may be defined in the future for implementing a new protocol feature when at recessive value (i.e., 1).

When a Classical CAN node receives frame 400, it inspects the FDF bit, which in a CAN frame would correspond to reserved (r0) bit, and takes action only if the FDF bit is dominant. If the FDF bit is recessive, ISO-defined protocol exception techniques allow the Classical CAN node to treat frame 400 as following the CAN FD protocol and to stop processing the frame; but also to refrain from sending an error message back into the CAN network.

In some implementations, frame 400 may have alternative or additional fields than shown in FIG. 4. It should be kept in mind that, although certain fields in frame 400 may be uniquely important in order to implement the systems and methods described herein, frame 400 is being provided only as an example. For instance, various other embodiments may include a "stuff count" field (not shown) within CRC field 405, such that this "stuff count" field has 4 bits. In other embodiments, one or more fields may be added and/or one or more other fields may be removed from frame 400. Moreover, these fields may have any suitable number of bits. For example, ins some cases the number of bits in CRC field 405 may be either 17 or 21, depending upon the size available within frame 400 for CRC field 405.

As previously noted, problems may arise, for example, when a CAN frame is transmitted targeting a Classical CAN node, and therefore the CAN frame has a dominant FDF bit, but the FDF bit is inadvertently or accidentally changed into a recessive bit during transmission and/or reception by the Classical CAN node ("local error"). As such, the Classical CAN frame is interpreted by the Classical CAN node as a CAN FD frame and is ignored by that node, which enters the protocol exception state and stays in integrating mode waiting for the end of that frame, according to the ISO protocol exception specification. If the remainder of the receiving nodes in the CAN bus acknowledge the frame as correct, then the message will unfortunately not be retransmitted and the conventional CAN node, which was the original target for the message, will miss that message.

A similar problem occurs if the RES bit in a CAN FD frame is inadvertently or accidentally changed into a recessive bit during the reception by a CAN FD node. In that case, the CAN FD frame is interpreted by the CAN FD node as a frame with new functionality (to be specified in the future) and is ignored by that node, which enters the protocol exception state and stays in integrating mode waiting for the end of that frame, according to the ISO specification. If the remainder of the receiving nodes in the CAN bus acknowledge the frame as correct, then the message will unfortunately not be retransmitted and the CAN FD node, which was the original target for the message, will miss that message.

In some embodiments, systems and methods described herein may provide an enhanced protocol exception mode for protocol-tolerant communications in the aforementioned scenario(s). Particularly, upon receipt of a frame having a recessive FDF frame, which ordinarily indicates that the frame is in a CAN FD format, a protocol-tolerant CAN node continues to inspect the frame to match its fields to expected fields that indicate whether the frame is following the CAN or the CAN FD format. After detecting that the FDF bit is recessive, if an invalid CAN FD format is detected, and an error frame is generated. The frame is then retransmitted and the node eventually receives the message in its original form; that is, with a dominant FDF bit.

Similarly, upon receipt of a CAN FD frame having a recessive RES bit, which ordinarily may indicate that the frame has new functionality and frame structure to be defined in the future, a protocol-tolerant CAN node continues to inspect the frame to match its fields to expected fields that indicate whether the frame is following the CAN FD format or a new format to be specified as a CAN protocol expansion. After detecting that the RES bit is recessive, if an invalid CAN format is detected, an error frame is generated. The frame is then retransmitted and the node eventually receives the message in its original form; that is, with a dominant RES bit.

Figure 5:
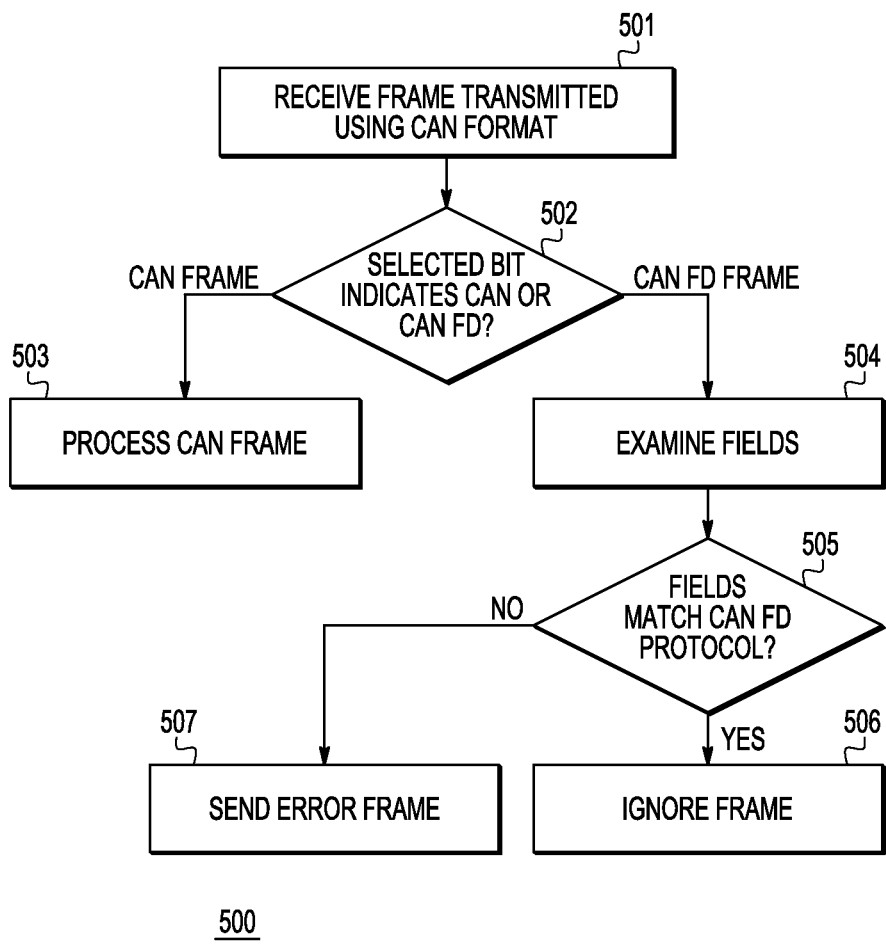
FIG. 5 is a flowchart of a method for protocol-tolerant communications in a CAN according to some embodiments.

FIG. 5 is a flowchart of a method for protocol-tolerant communications in a CAN network according to some embodiments. Method 500 may be performed, for example, by a receiving node in a CAN network, and, in particular, by a Classical CAN node (that is, a node capable of processing a CAN frame, but not a CAN FD frame) with enhanced protocol exception capabilities that allow the node to detect CAN frames otherwise indicated as CAN FD frames due to a transmission or reception error, bus error, interference, etc.

At block 501, method 500 includes receiving a frame following a Classical CAN format. At block 502, method 500 includes selecting a particular bit configured to indicate whether the received frame follows a CAN or CAN FD format. In some cases, the selected bit may be the FDF bit. Additionally or alternatively, the selected bit may be the RES bit. If block 502 determines based upon the selected bit that the frame is a Classical CAN frame, block 503 processes the CAN frame.

On the other hand, if block 502 determines based upon the selected bit that the frame is a CAN FD frame, block 504 examines subsequent fields in the frame and attempts to match the positions of fields within the frame to the positions of expected fields of frames following the CAN FD format when FDF bit was selected, or a new CAN format to be defined when RES bit was selected. If block 505 determines that the examined fields match the expected fields in a CAN FD frame, then block 506 ignores the frame. Otherwise, block 507 responds by sending an error frame to prompt the transmitting node to re-transmit the same message, and the error frame is configured to trigger re-transmission of the frame. In some cases, block 507 may also cause the node to cease receipt of the frame and to enter an integrating mode.

In an illustrative, non-limiting embodiment, a method may include receiving a frame at a network node; identifying, by the network node, a bit in a selected field of the frame; and determining, by the network node, that the frame follows a second format despite the bit indicating that the frame follows a first format. In some implementations, the network may be a CAN network. The first format may be a CAN FD format and the second format may be a Classical CAN format. Generally, the network node is not compatible with the first format.

In some cases, the selected field may include an FDF bit of the frame. Additionally or alternatively, the selected filed may include a reserved bit of the frame. Determining that the frame is in the second format may include determining that the bit is in error. Additionally or alternatively, determining that the frame follows the second format may include examining subsequent fields in the frame and matching the positions of the other fields within the frame to the positions of expected fields of frames following the second format. The determining operation may be part of a format exception procedure performed by the network node, and the format exception procedure may include stopping receipt of the frame and entering an integrating mode.

The method may further include transmitting an error frame in accordance with the second format in response to the frame containing an error, the error frame configured to trigger re-transmission of the frame. Also, the network node may be configured to ignore the frame in response to the frame following the first format.

In another illustrative, non-limiting embodiment, a CAN node may include message processing circuitry; and a memory coupled to the message processing circuitry, the memory having program instructions stored thereon that, upon execution by the message processing circuitry, configure the message processing circuit to: receive a frame; identify a bit in a selected field of the frame; and determine that the frame follows a Classical CAN format despite the bit indicating that the frame follows a CAN FD format. The CAN node is not compatible with the CAN FD format, and the program instructions further configure the message processing circuit to ignore the frame in response to the frame following the CAN FD format.

The selected field may include at least one of: an FDF bit of the frame or a reserved bit of the frame. Determining that the frame follows the Classical CAN format may include determining that the bit is in error. Also, determining that the frame follows the Classical CAN format may include examining subsequent fields in the frame and matching the positions of the other fields within the frame to the positions of expected fields of frames following the Classical CAN format as opposed to the CAN FD format.

The determining operation is part of a format exception procedure performed by the CAN node. The program instructions, upon execution by the message processing circuitry, further configure the message processing circuit to transmit an error frame in accordance with the Classical CAN format in response to the frame containing an error, the error frame configured to trigger re-transmission of the frame.

In yet another illustrative, non-limiting embodiment, a CAN network may include: a CAN bus; and a plurality of CAN nodes coupled to the CAN bus, wherein a given one of the CAN nodes is compatible with a Classical CAN format and incompatible with a CAN FD format, wherein the given CAN node is configured to ignore frames following the CAN FD format, and wherein the given CAN node is further configured to: receive a frame via the CAN bus; identify an FDF bit or a reserved bit within the frame; and determine that the frame follows the Classical CAN format despite the bit indicating that the frame follows the CAN FD format.

In some cases, determining that the frame follows the Classical CAN format may include, as part of a format exception procedure, examining subsequent fields in the frame and matching the positions of the other fields within the frame to the positions of expected fields of frames if the framed followed the Classical CAN format as opposed to the CAN FD format Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The term "coupled" is defined as connected, although not necessarily directly, and not necessarily mechanically. The terms "a" and "an" are defined as one or more unless stated otherwise. The terms "comprise" and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
    receiving a frame at a network device, wherein the network device is compatible with frames in a first format and not in a second format;
    inspecting one or more fields of the frame, by the network device, in response to a determination, by the network device, that an identified bit in a selected field of the frame indicates that the frame follows the second format; and
    in response to the one or more fields of the frame matching fields expected of the second format, determining, by the network device, that the frame is in the second format, and ignoring the frame; and
    in response to the one or more fields of the frame not matching the fields expected of the second format, determining, by the network device, that the identified bit is in error, and requesting re-transmission of the frame.

2. The method of claim 1, wherein the network is a Controller Area Network (CAN) network.

3. The method of claim 2, wherein the second format is a flexible data-rate CAN (CAN RD) format and wherein the first format is a Classical CAN format.

4. The method of claim 2, wherein the selected field includes an FD format (FDF) bit of the frame.

5. The method of claim 2, wherein the selected field includes a reserved (RES) bit of the frame.

6. The method of claim 1, wherein determining that the frame follows the second format further includes matching the positions of the other fields within the frame to the positions of expected fields of frames following the second format.

7. The method of claim 1, wherein the determining operation is part of a format exception procedure performed by the network device, and wherein the format exception procedure further includes stopping receipt of the frame and entering an integrating mode.

8. The method of claim 1, further comprising an error frame in accordance with the second format in response to the frame containing an error, the error frame configured to trigger re-transmission of the frame.

9. A Controller Area Network (CAN) device comprising:
    message processing circuitry; and
    a memory coupled to the message processing circuitry, the memory having program instructions stored thereon that, upon execution by the message processing circuitry, configure the message processing circuit to:
    receive a frame;
    identify a bit in a selected field of the frame; and
    determine that the frame follows a Classical CAN format despite the bit indicating that the frame follows a flexible data-rate CAN (CAN FD) format.

10. The CAN device of claim 9, wherein the CAN device is not compatible with the CAN FD format and wherein the program instructions, upon execution by the message processing circuitry, further configure the message processing circuit to ignore the frame in response to the frame following the CAN FD format.

11. The CAN device of claim 9, wherein the selected field includes at least one of: an FD format (FDF) bit of the frame or a reserved (RES) bit of the frame.

12. The CAN device of claim 9, wherein determining that the frame follows the Classical CAN format further includes determining that the bit is in error.

13. The CAN device of claim 9, wherein determining that the frame follows the Classical CAN format includes examining subsequent fields in the frame and matching the positions of the other fields within the frame to the positions of expected fields of frames following the Classical CAN format as opposed to the CAN FD format.

14. The CAN device of claim 9, wherein the determining operation is part of a format exception procedure performed by the CAN device.

15. The CAN device of claim 9, wherein the program instructions, upon execution by the message processing circuitry, further configure the message processing circuit to transmit an error frame in accordance with the Classical CAN format in response to the frame containing an error, the error frame configured to trigger re-transmission of the frame.

16. A Controller Area Network (CAN) network, comprising:
    a CAN bus; and
    a plurality of CAN devices coupled to the CAN bus, wherein a given one of the CAN devices is compatible with a Classical CAN format and incompatible with a flexible data-rate CAN (CAN FD) format, wherein the given CAN device is configured to ignore frames following the CAN FD format, and
    wherein the given CAN device is further configured to:
    receive a frame via the CAN bus;

identify an FD format (FDF) bit or a reserved (RES) bit within the frame; and determine that the frame follows the Classical CAN format despite the bit indicating that the frame follows the CAN FD format.

17. The CAN network of claim 16, wherein determining that the frame follows the Classical CAN format includes, as part of a format exception procedure, examining subsequent fields in the frame and matching the positions of the other fields within the frame to the positions of expected fields of frames if the frame followed the Classical CAN format as opposed to the CAN FD format.

* * * * *